United States Patent
Givens

(10) Patent No.: US 7,603,258 B2
(45) Date of Patent: Oct. 13, 2009

(54) NOISE REDUCTION AND ESTIMATION OF PIPELINE SIGNALS

(75) Inventor: Maurice Givens, Chicago, IL (US)

(73) Assignee: Gas Technology Institute, Des Plaines, IL (US)

( * ) Notice: Subject to any disclaimer, the term of this patent is extended or adjusted under 35 U.S.C. 154(b) by 483 days.

(21) Appl. No.: 11/265,973

(22) Filed: Nov. 3, 2005

(65) Prior Publication Data

US 2007/0100587 A1    May 3, 2007

(51) Int. Cl.
    *G06F 15/00*    (2006.01)
(52) U.S. Cl. ...................................... 702/191
(58) Field of Classification Search ................. 702/191, 702/190, 198; 381/71.1, 71.2, 71.5, 94.1
    See application file for complete search history.

(56) References Cited

U.S. PATENT DOCUMENTS

| | | | | |
|---|---|---|---|---|
| 4,833,453 A | * | 5/1989 | Twerdochlib | 340/540 |
| 5,329,472 A | * | 7/1994 | Sugiyama | 708/322 |
| 5,568,558 A | * | 10/1996 | Ramm et al. | 381/94.4 |
| 2007/0090980 A1 | * | 4/2007 | Lin | 341/143 |

OTHER PUBLICATIONS

Julie Johnson, Ultra low-power sub-band acoustic echo cancellation for wireless headsets, May 17, 2004, p. 1-5.*
Julie Johnson, Ultra low-power sub-band acoustic echo cancellation for wireless headsets, May 17, 2004.*

* cited by examiner

*Primary Examiner*—Tung S Lau
(74) *Attorney, Agent, or Firm*—Mark E. Fejer

(57) ABSTRACT

A method and apparatus for sensor output signal noise reduction in which at least one sensor output signal is introduced into an LMS-based adaptive noise cancellation mechanism and the resulting noise cancellation mechanism output signal is processed using a sub-band spectral subtractive mechanism, producing a reduced noise signal.

15 Claims, 7 Drawing Sheets

NOISE REDUCTION AND ESTIMATION OF PIPELINE SIGNALS

BACKGROUND OF THE INVENTION

1. Field of the Invention

This invention relates generally to the reduction of noise in signals having an amplitude that varies over time including, but not limited to, signals generated by impacts, transients, speech, RF (radio frequency) sources and the like, and that are subject to external and/or intrinsic noise. More particularly, this invention relates to a method and apparatus for reducing the noise associated with acoustic sensor outputs, including the output signals of seismic sensors, such as those employed in the measurement of underground pipeline noise. The invention reduces non-white noise and correlated noise, as well as white noise, from the output of sensors placed on pipelines for reasons including monitoring for pipeline strikes or impacts by excavation equipment, falling rocks, etc., and monitoring of pipeline movement, such as movement caused by earthquakes.

2. Description of Related Art

Underground pipelines are widely used to transport a variety of fluids, including oil, natural gas, water, etc., from one place to another. Such underground systems are subject to damage from a variety of sources, both naturally occurring and man-made. For example, subsidence of the soil, local construction projects, seismic activity, and weather can all lead to defects and anomalies in the pipeline. Also, harsh environments can cause pipelines to move gradually over time, leading to defects, cracks, leaks, bumps, and other anomalies, within the interior of the pipeline.

Continuous monitoring of long pipelines, whether for seismic events or impacts occurring during excavation in proximity to the pipeline, is not a simple task. Damage to pipelines can be detected in a variety of ways including detection of the substance that escapes from the pipeline as the result of the damage, pressure drops in the pipeline, and impacts on the pipeline.

There are several systems and methods known to those skilled in the art for continuously monitoring the condition of underground pipelines. Acoustic monitoring of an underground pipeline may be carried out by a variety of acoustic sensors/detectors, such as geophones, accelerometers and the like. One problem with the use of acoustic means for monitoring underground pipelines is noise, both background and sensor noise, in the output signal from these means, which noise may partially or possibly completely mask the signal of interest, thereby precluding detection of the pipeline condition. For example, while sounds associated with impacts on a pipeline can be transmitted through the pipeline and detected at substantial distances from the point of contact via such highly sensitive acoustic sensors, the high sensitivity of such sensors can produce or result in a significant number of false calls arising from sources such as passing vehicles and weather conditions such as thunder. Accordingly, to better enable the use of acoustic means for monitoring underground pipelines, it is desirable that the noise in the output signals from the acoustic sensors/detectors be substantially reduced or, if possible, entirely eliminated.

SUMMARY OF THE INVENTION

It is, thus, one object of this invention to provide a method and apparatus for reducing the amount of noise associated with sensor output signals having an amplitude that varies over time.

It is another object of this invention to provide a method and apparatus for reducing the amount of noise associated with acoustic sensor signal output signals.

These and other objects of this invention are addressed by a method for sensor signal noise reduction in which the output acoustic data signal from the sensor/detector is processed by an LMS-based adaptive noise cancellation mechanism, producing a noise cancellation mechanism output signal. The noise cancellation mechanism output signal is then processed using a sub-band spectral subtraction mechanism, producing a reduced noise acoustic data signal.

These and other objects of this invention are also addressed by a sound detection apparatus comprising an acoustic signal processor and at least one acoustic sensor detecting a sound and transmitting an acoustic data signal to the acoustic signal processor. The acoustic signal processor comprises a computer program for reducing signal noise in the acoustic data signal. The computer program includes an LMS-based adaptive noise cancellation mechanism which processes the acoustic data signal and generates a noise cancellation mechanism output signal. The computer program further includes a sub-band spectral subtractive noise reduction mechanism which processes the noise cancellation mechanism output signal and generates a reduced noise acoustic data signal.

The method of this invention, although described herein for use in connection with acoustic monitoring of underground pipelines, may be used in connection with any application of sensors/detectors in which the reduction of signal noise is important. As used herein, the term "signal noise" refers to noise generated external to the sensor/detector as well as noise that is intrinsic to the sensor/detector. The method of this invention is applicable to variable amplitude signals, such as those produced by an impact on a pipeline during excavation around the pipeline, those produced by speech, and those generated by radio transmitters. The method of this invention may be applied to the output signal from a single sensor and to the output signals from a plurality of sensors. Typically, acoustic monitoring of underground pipelines utilizes a plurality of acoustic sensors.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

The method in accordance with one embodiment of this invention employs a combination of two sensor output signal processing means for reducing the signal noise associated with the signal, namely passing of the signal through a least mean square (LMS) based adaptive noise cancellation mechanism, a parametric process, and processing of the output signal from the LMS-based adaptive noise cancellation mechanism by a sub-band spectral subtraction noise reduction mechanism and signal estimation routine, a non-parametric process. LMS-based adaptive noise cancellation algorithms are well-known to those skilled in the art and such algorithms are generally suitable for use in the method of this invention. Likewise, sub-band spectral subtraction algorithms are also known to those skilled in the art and are generally suitable for use in the method of this invention. It will be understood that the LMS-based adaptive noise cancellation mechanism and/or the sub-band spectral subtraction mechanism employed in the method of this invention may be integral with the sensor(s) used or may reside within a separate signal processor. For acoustic-based applications of the method of this invention, suitable sensors include, but are not limited to, microphones, geophones, accelerometers and velocity sensors.

Figure 1:
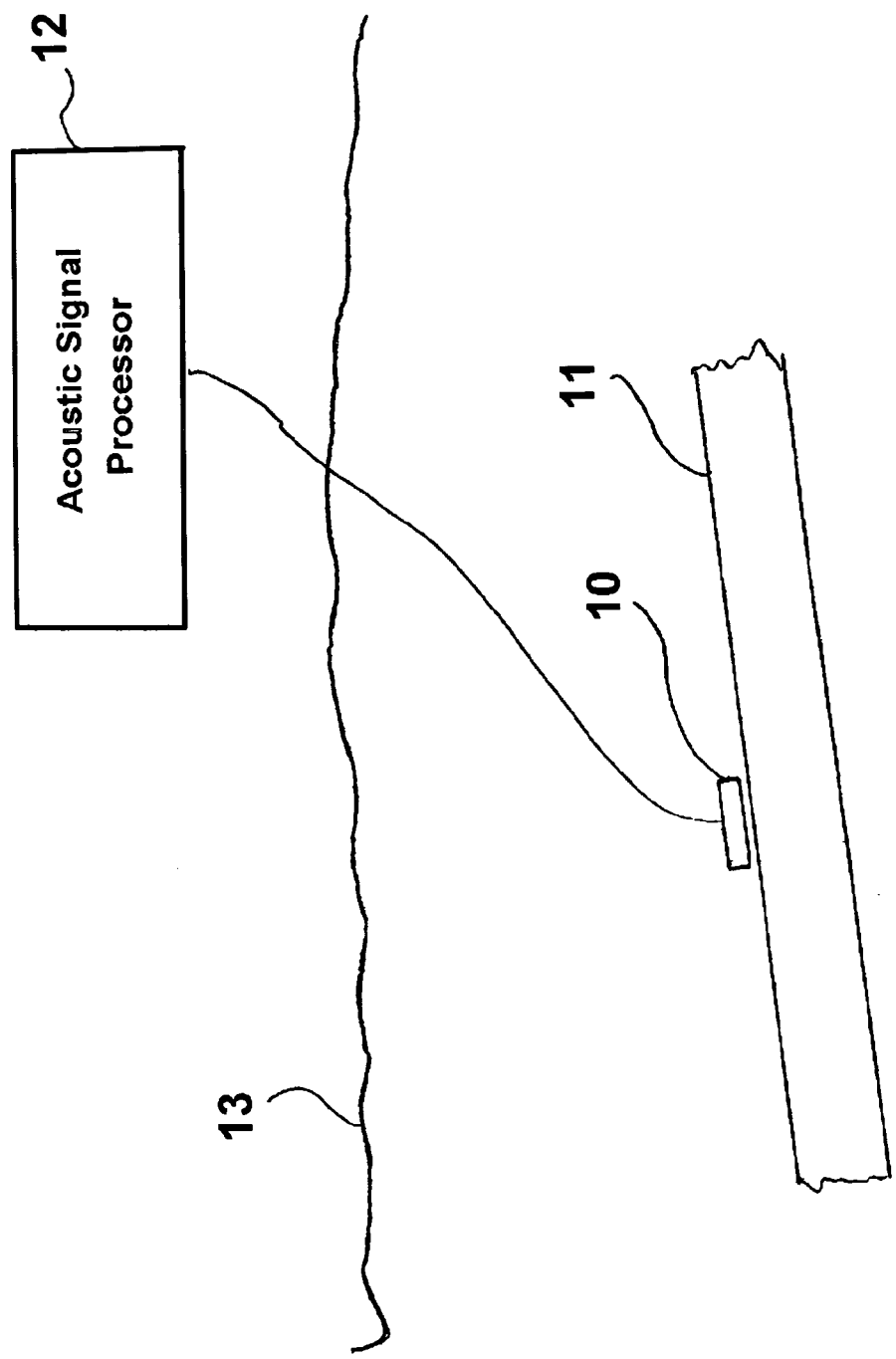
FIG. 1 is a diagram showing the basic components of a system for detecting acoustic signals.

FIG. 1 shows a diagram of the basic components for measurement of underground pipeline noise. As shown therein, the basic components include at least one acoustic sensor 10, which may or may not be disposed proximate underground pipe 11 disposed beneath the ground surface 13, on which pipeline measurements of noise are being made. The at least one acoustic sensor 10 is operably connected with an acoustic signal processor 12 in which the acoustic data signal generated by the at least one acoustic sensor 10 is processed to reduce unwanted noise associated therewith.

Figure 2:
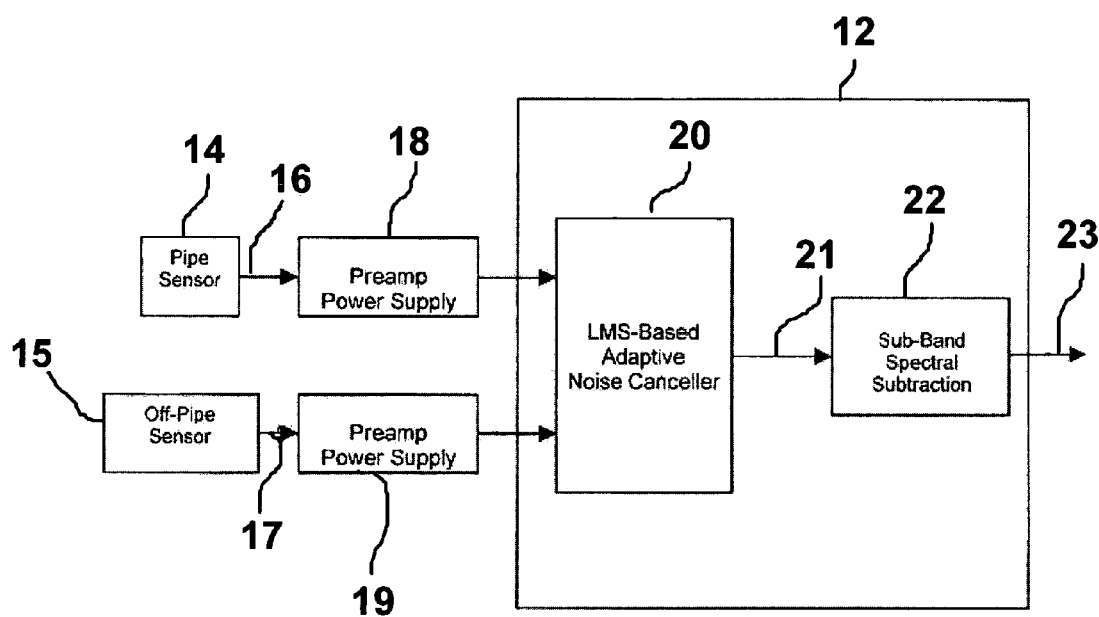
FIG. 2 is a diagram showing a system for reducing acoustic data signal noise in accordance with one embodiment of this invention.

FIG. 2 shows a system for measuring underground pipeline noise in accordance with one embodiment of this invention utilizing two acoustic sensors, acoustic sensor 14 disposed in contact with the underground pipeline and acoustic sensor 15 disposed in a location that can detect off-pipeline noises and not detect on-pipeline noises, typically at a distance from the underground pipeline. Suitable sensors for use in the method of this invention are Model ICP sensors available from PCB Piezotronics, Depew, N.Y. The sensor output signals 16 and 17, respectively, are introduced into preamps 18, 19, the output signals of which are introduced into acoustic signal processor 12. Acoustic signal processor 12 comprises LMS-based adaptive noise cancellation mechanism 20 by which noise associated with the surrounding environment is reduced. The reduced noise signal 21 produced by the LMS-based adaptive noise cancellation mechanism 20 is then introduced into a sub-band, spectral subtraction, noise reduction and signal estimation mechanism 22, which produces a further noise reduced signal 23. This combination provides an improvement in noise reduction and signal estimation over the individual usage of an LMS-based adaptive noise cancellation mechanism and a sub-band spectral subtraction mechanism. This combination also provides an improvement over what would normally be expected from the combination based upon the results obtained from using each of the components alone.

Figure 3:
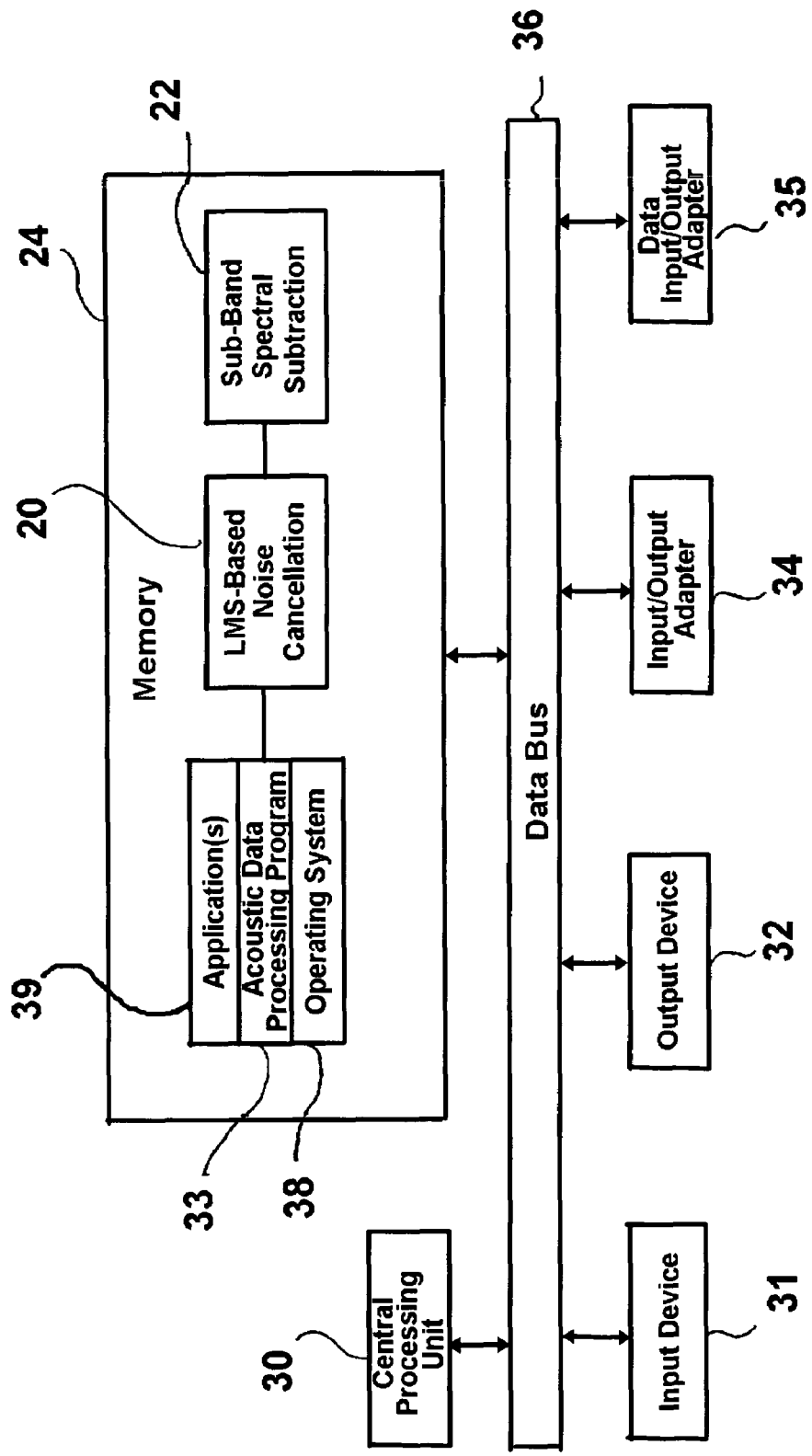
FIG. 3 is a diagram showing an acoustic signal processor in accordance with one embodiment of this invention.

FIG. 3 is a schematic diagram showing the basic components of acoustic signal processor 12 in accordance with one embodiment of this invention. As shown therein, acoustic signal processor 12 comprises central processing unit 30 and memory 24. Acoustic signal processor 12 further comprises at least one input device 31, such as a keyboard, at least one output device 21, such as a display, at least one input/output adapter 34 for uploading and downloading data from any suitable computer-readable medium, and data input/output adapter 35 for receiving signals from remote acoustic sensors 14, 15. Acoustic signal processor 12 further comprises a memory 24, i.e. a computer-readable medium, which stores an operating system 38 for the processor, any additional applications 39 which may be used by the processor, and an acoustic data processing program 33, which program includes an LMS-based noise cancellation mechanism 20 and a sub-band spectral subtraction mechanism 22. Communication between each of the acoustic signal processor components is by way of data bus 36. It will be appreciated by those skilled in the art that the memory 24 can comprise random access memory (RAM) and/or read only memory (ROM).

LMS-based noise cancellation mechanism 20 includes a least-mean squares (LMS) algorithm which estimates the acoustic data signal output by minimizing the squared difference (error) between an estimated signal and the true, or desired, signal. The estimation relies upon the principle that given the impulse response of any acoustic sensor, the acoustic data signal output can be predicted exactly by the convolution of the input signal and the impulse signal. The LMS algorithm estimates the acoustic sensor impulse response and predicts the output by convolving an estimate of the acoustic sensor impulse with an input signal common to both the estimator and the true/desired system.

The estimation of the impulse response is improved (updated) over a predetermined interval of time using the gradient of a hyperparabola formed by a squared error signal in an arbitrary k-dimensional space. The basic algorithm is as follows.

Firstly, an estimated signal is formed by the vector product of the estimated impulse response, f(t), and the input signal, x(t), at time instance $\alpha t$, $\alpha=0$ to infinity, and f(t), x(t) are vectors of k-dimensions.

$$y(\alpha t) = f(\alpha t)^T x(\alpha t)$$

Secondly, an error signal, e(t), is produced by taking the difference of the true/desired signal d(t) and the estimated signal y(t).

$$e(\alpha t) = d(\alpha t) - y(\alpha t)$$

Thirdly, the estimate of the system impulse response is updated with $$f(\alpha t + \delta t) = f(\alpha t) + \gamma e(\alpha t) x(\alpha t)$$

where δt defines the predetermined interval of time, γ is a constant factor used to increase or decrease the speed of convergence of the estimated impulse response.

The output from the LMS-based adaptive noise cancellation mechanism in accordance with the method of this invention is designated as x(k), which is then processed by the sub-band spectral subtraction mechanism as follows:

$x(k)$ is decomposed into m sub-bands, $x_n(k)$, $n=0 \ldots m-1$ $$\sigma_x(k) = (1 - \alpha_c)\sigma_x(k - 1) + \alpha_c x^2(k)$$
$$\downarrow$$
$$\sigma_s(k) = (1 - \alpha_d)\sigma_s(k - 1) + \alpha_d \sigma_x(k)$$
$$\downarrow$$
$$\sigma_\eta(k) = (1 - \alpha_b)\sigma_\eta(k - 1) + \alpha_b \sigma_x(k)$$
$$\downarrow$$
$$SIG = \begin{cases} 1 & \frac{\sigma_s(k)}{\sigma_\eta(k)} > \beta \\ 0 & \frac{\sigma_s(k)}{\sigma_\eta(k)} \leq \beta \end{cases}$$
$$\downarrow$$
$$\sigma_x^n(k) = \begin{cases} (1 - \alpha_d)\sigma_x^n(k - 1) + \alpha_d |\sigma_n(k)| & SIG = 1 \\ (1 - \alpha_a)\sigma_x^n(k - 1) + \alpha_a |\sigma_n(k)| & SIG = 0 \end{cases}$$
$$\downarrow$$
$$\sigma_\eta^n(k) = \begin{cases} (1 - \alpha_b)\sigma_\eta^n(k - 1) + \alpha_b |\sigma_n(k)| & SIG = 1 \\ (1 - \alpha_a)\sigma_\eta^n(k - 1) + \alpha_a |\sigma_n(k)| & SIG = 0 \end{cases}$$
$$\downarrow$$
$$g_n(k) = 1 - \frac{\sigma_\eta^n(k)}{\sigma_x^n(k)}$$
$$\downarrow$$
$$y(k) = \sum_{n=0}^{m-1} x_n(k)g_n(k)$$

where $\sigma_n(k)$ is the level of the decomposed signal in sub-band n, n=0 ... m−1, and y(k) is the noise-reduced estimate of the pipe sensor output. Constants $a_a$, $a_b$, $a_c$, and $a_d$ are such that $\sigma_x$ increases and decreases quickly to form an envelope of the signal. $\sigma_\eta$ should increase slowly and decrease quickly. $\sigma_s$ should increase quickly and decrease slowly. These constants can be varied to realize different effects of the noise reduction and signal estimation.

The noise reduction algorithm employed in the method and apparatus of this invention is implemented in three software functions: Function NR acts as the main control function for the computation of the noise-reduced signal. The function controls the timely application of the LMS and sub-band noise reduction functions; Function ANC implements the LMS-based adaptive noise cancellation algorithm. The function receives the primary acoustic sensor signal and the background acoustic sensor signal to compute a noise-reduced version of the primary acoustic signal; Function SB_NR implements the sub-band noise reduction algorithm. The function receives the LMS-based noise-reduced signal, the sampling rate of the noise-reduced signal, and a constant to control the bandwidth of each sub-band. For the exemplary case of pipeline monitoring, these functions are set forth in the appendix.

EXAMPLE 1

Figure 4:
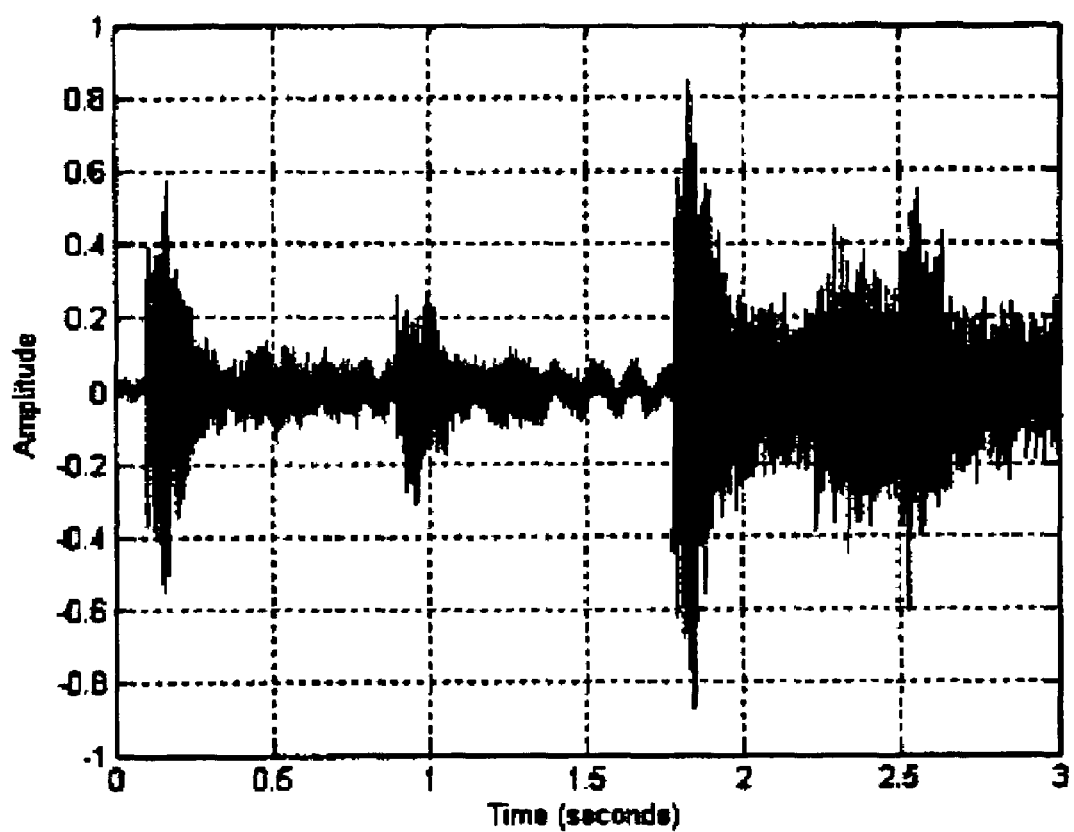
FIG. 4 is a diagram showing an unprocessed acoustic sensor output signal generated by two impacts on a pipeline.

In this example, using a setup of two acoustic sensors, one disposed on an underground pipeline and the other disposed at a distance from the underground pipeline, the pipeline was subjected to two impacts in succession. FIG. 4 shows the unprocessed acoustic sensor output signal generated by the two impacts. As can be seen, although the pipeline was only struck twice, FIG. 4 seems to show the pipeline as having been struck three times—once at about 0.2 seconds, once at about 0.95 seconds, and once at about 1.8 seconds.

Figure 5:
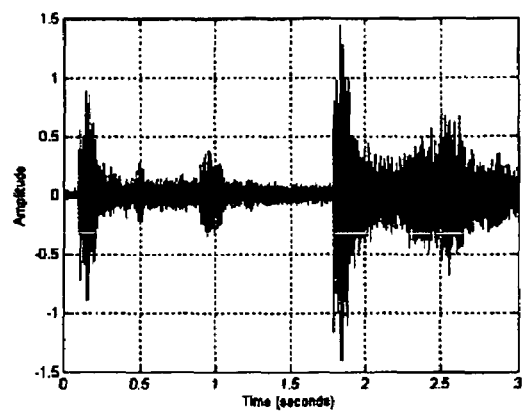
FIG. 5 is a diagram showing the signal of FIG. 4 after processing only by an LMS-based adaptive noise cancellation mechanism in accordance with the method of this invention.
Figure 6:
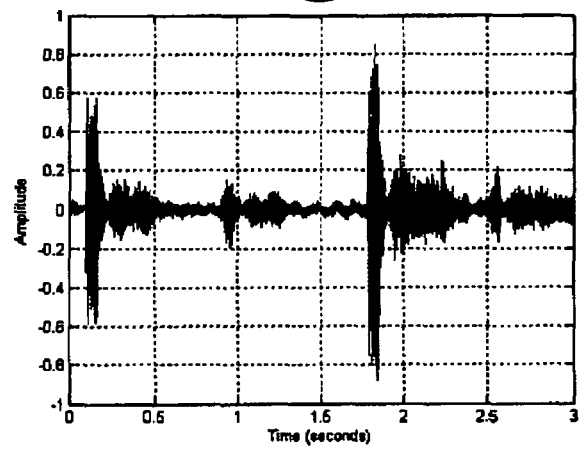
FIG. 6 is a diagram showing the signal of FIG. 4 after having been processed only by the sub-band spectral subtraction mechanism in accordance with one embodiment of this invention.

Processing the signal shown in FIG. 4 with the LMS-based adaptive noise cancellation mechanism alone produced the signal shown in FIG. 5, which continues to suggest that the pipeline was struck three times. In addition, the LMS-based adaptive noise cancellation mechanism accentuated the noise at about 0.5 seconds such that it begins to appear as yet an additional (fourth) impact on the pipeline. Processing the signal shown in FIG. 4 with the sub-band spectral subtraction mechanism alone produced the signal shown in FIG. 6, which provided only marginal improvement up to about 1.9 seconds, but produced a substantial reduction beyond 1.9 seconds. When the sensor signals of FIGS. 4-6 were played through a speaker, it sounded as though there were three distinct impacts on the pipeline.

Figure 7:
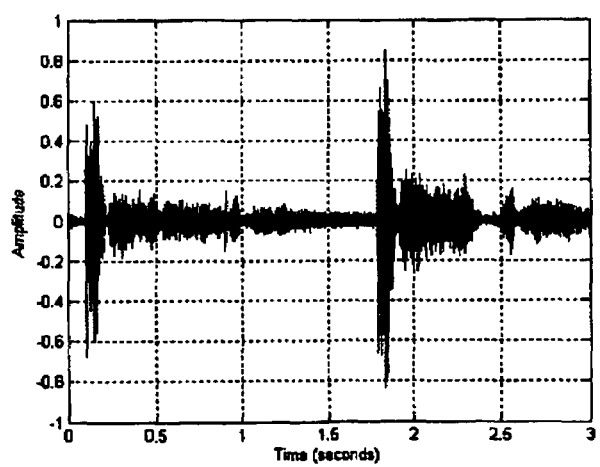
FIG. 7 is a diagram showing the signal of FIG. 4 after having been processed by an LMS-based adaptive noise cancellation mechanism and by a sub-band spectral subtraction mechanism in accordance with one embodiment of the method of this invention.

FIG. 7 shows the signal obtained using the combination of the LMS-based adaptive noise cancellation mechanism and the sub-band spectral subtraction mechanism in accordance with one embodiment of the method of this invention. As can be seen, the signal appearing at about 0.95 seconds, which appeared in FIGS. 4-6 to be representative of an impact on the pipeline, was actually part of the decaying noise from the first impact on the pipeline. Indeed, when played back through a speaker, this noise was heard to be a reverberation within the pipeline. This is a surprising result, particularly because neither the LMS-based adaptive noise cancellation mechanism nor the sub-band spectral subtraction mechanism alone were able to achieve such an accurate signal estimate and because of the fact that the LMS-based adaptive noise cancellation mechanism utilizes a parametric method and the sub-band spectral subtraction mechanism utilizes a non-parametric method, providing a parametric/non-parametric result. By comparison, Fourier and Wavelet transform methods employed in conventional noise reduction schemes are both parametric methods.

EXAMPLE 2

Figure 8:
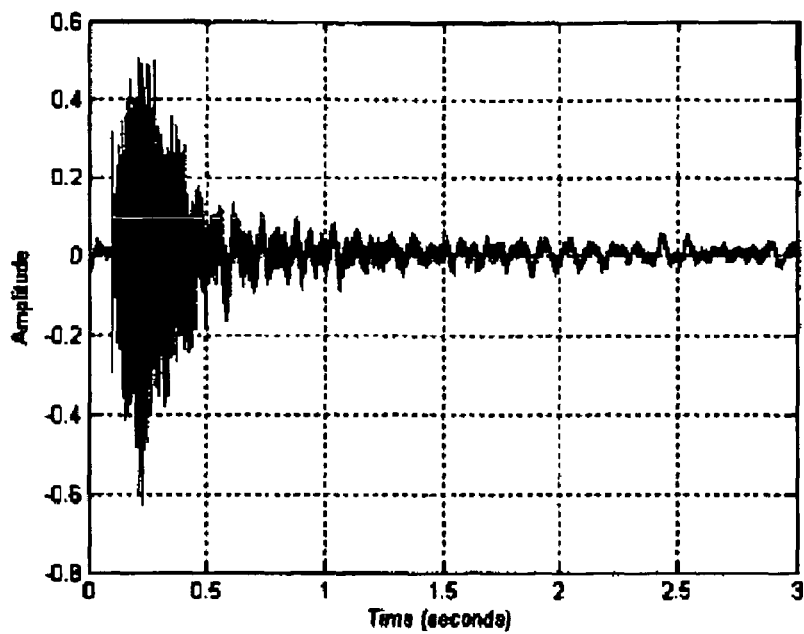
FIG. 8 is a diagram of an unprocessed acoustic sensor output signal generated by a single impact on a pipeline.
Figure 9:
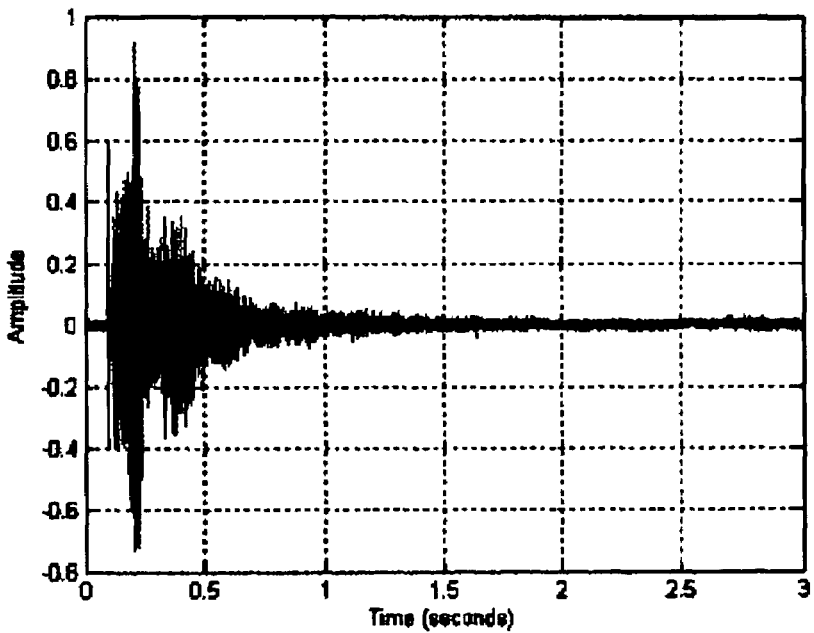
FIG. 9 is a diagram showing the signal of FIG. 8 after processing only by an LMS-based adaptive noise cancellation mechanism in accordance with the method of this invention.
Figure 10:
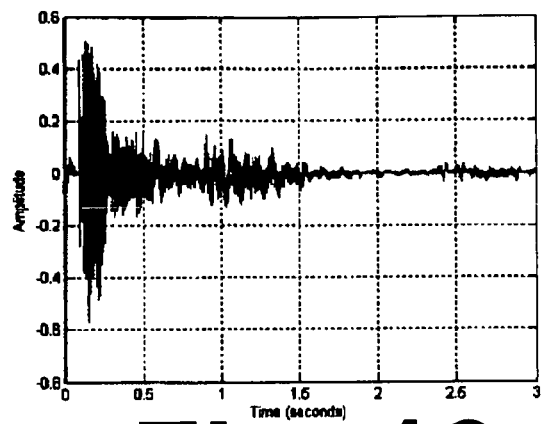
FIG. 10 is a diagram showing the signal of FIG. 8 after having been processed only by the sub-band spectral subtraction routine in accordance with one embodiment of this invention.

In this example, employing the setup of Example 1, the pipeline was subjected to a single impact. FIG. 8 shows the pipeline sensor output resulting from the single impact on the pipeline. Using only the LMS-based adaptive noise cancellation mechanism produced the result shown in FIG. 9. As can be seen, some of the extraneous noise is reduced, but there is not much difference between the input signal to the LMS-based adaptive noise cancellation mechanism (FIG. 8) and the output signal from the LMS-based adaptive noise cancellation mechanism. Using only the sub-band spectral subtraction mechanism on the signal of FIG. 8 produced the results shown in FIG. 10. A comparison of the results shown in FIG. 10 with the original signal shown in FIG. 8 clearly shows increases in signal noise over a portion of the waveform, a result which could be interpreted as a signal that is worse than the original signal.

Figure 11:
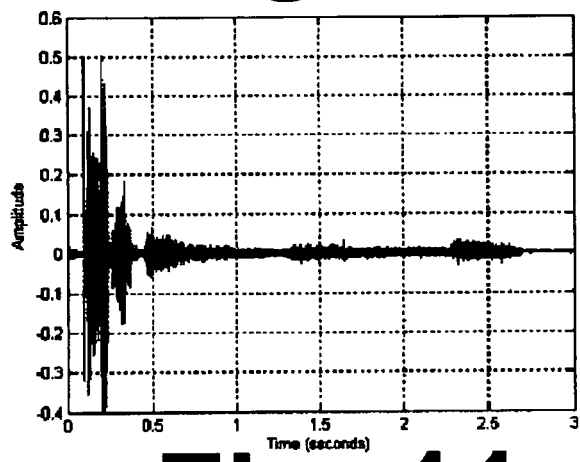
FIG. 11 is a diagram showing the signal of FIG. 8 after having been processed by an LMS-based adaptive noise cancellation mechanism and by a sub-band spectral subtraction mechanism in accordance with one embodiment of the method of this invention.

FIG. 11 shows the signal obtained using the combination of the LMS-based adaptive noise cancellation mechanism and the sub-band spectral subtraction mechanism on the signal of FIG. 8 in accordance with one embodiment of the method of this invention. As can clearly be seen, the noise of the original signal shown in FIG. 8 has been substantially reduced, to the point that previously undetected reverberations at about 1.3 seconds and about 2.3 seconds are now evident.

Figure 12:
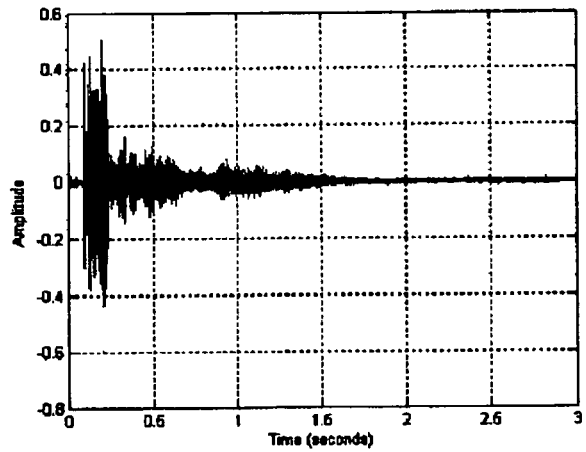
FIG. 12 is a diagram showing the signal of FIG. 8 after having first been processed by a sub-band spectral subtraction mechanism and then processed by an LMS-based adaptive noise cancellation mechanism.

FIG. 12 shows the signal obtained from processing the signal of FIG. 8 using the sub-band spectral subtraction mechanism followed by the LMS-based adaptive noise cancellation mechanism, the reversal of the order of usage in accordance with the method of this invention. As shown, the resulting signal is substantially noisier than the signal shown in FIG. 11, which is the result obtained using the method of this invention. For example, the reverberations of the original signal occurring at about 1.3 seconds and 2.3 seconds as shown in FIG. 11 are not evident. Accordingly, the order in which the signal processing steps employed in the method of this invention are carried out is critical to obtaining the desired results.

As previously indicated, the waveform shown in FIGS. 4-12 are derived from a system in which two acoustic sensors are employed and the output signals from the sensors are the result of impacts on an underground pipeline. Also, as previously indicated, the method of this invention can be used to address two types of output signal noise, background noise from the environment proximate the sensors and inherent sensor noise. It should be noted that processing of the output signals in accordance with the method of this invention to address both types of noise requires the use of at least two acoustic sensors. For acoustic applications employing a single acoustic sensor, only inherent sensor noise is completely addressed by the method of this invention. In addition, for acoustic sensing applications employing a single acoustic sensor, only acoustic sensor output signals generated by periodic events can be successfully processed in accordance with the method of this invention. In addition, processing an output signal from a single acoustic sensor in accordance with one embodiment of the method of this invention requires the use of an adaptive line enhancement mechanism in connection with the LMS-based adaptive noise cancellation.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

APPENDIX

C Listings of Computational Functions

```
                          FUNCTION NR
nr(xpipe, xbkgnd)
{
/*
This function acts as the main function for the computational functions. The
function receives the signals from the pipe sensor (xpipe) and the background
sensor (xbkgnd).
Send the pipe and background sensor data to the LMS adaptive noise cancellation
function
*/
        xpipe_lms = anc(xbkgnd, xpipe);
/*
LMS noise-reduced data is sent to sb_nr function for further noise-reduction
processing
*/
        y = sb_nr(xpipe_lms, fs, r);
        return(y);
}
/*
End of function
*/
                          FUNCTION ANC
anc(xbkgnd, xpipe)
{
/*
This function computes the LMS-based adaptive noise canceller. The function
receives the pipe sensor signal and the background reference signal
*/
/*
Define the length of the adaptive filter and the delay inserted to assure causality,
and initialize parameters
*/
int     length = 128, delta = 7, n = sizeof(xpipe), I, j;
float   hhat[length], x[length], y[length], yhat, x_pow, x_min, gain, yout[n];
        x_pow = 0;
        x_min = 0.0001;
        yhat = 0;
        gain = 0;
        for (j = 0; j < delta; j++){
            hhat[j] = 0;
            x[j] = 0;
            y[j] – 0;
        }
        for (j = delta; j < length; j++){
            hhat[j] = o;
            x[j] = o;
```

APPENDIX-continued

C Listings of Computational Functions

```
        }
/*
Compute convolution of yhat and hhat, determine error, compute signal power
*/
        for(I = 0; j < n; I++){
            yhat[i] = 0;
            for (j = 1; j < length ; j++){
                yhat[i] = yhat[i] + hhat[j] * x[j];
            }
            yout[i] = y[1] − yhat[i];
            x_pow = x_pow − x[1] * x[1] + x[length ] * x[length ];
/*
If signal is present, compute gain and update the estimate, hhat
*/
            if (x_pow > x_min){
                gain = yout[i]/x_pow;
                for (j = 1; j < lgth; j++] hhat[j] = hhat[j] + gain*x[j];
            }
/*
Shift data by one sample and insert next data sample
*/
            for (j = 1; J < delta− 1; j++) y[j] = y[j+1];
            for (j = 1; J < length − 1; j++) x[j] = x[j+1];
            x[length ] = xbkgnd[i];
            y[delta] = xpipe[i];
        }
        return(yhat)
}
                FUNCTION SB_NR
sb_nr(xpipe_lms, fs, r)
/*
This function implements the sub-band noise-reduction algorithm.
*/
int     j, k, n = sizeof(xpipe_lms), bins = (fs/2)/100, SIG;
float   x[n], alpha_a, alpha_b, alpha_c, alpha_d, Sx[n], Ss[n], Sη[n];
float   Sxk[n][bins], Sxnfb[n], xdfb[2][bins],Sηn[n][bins], Xd[bins], Sηnfb[bins];
/*
Determine σ_x, σ_s, and σ_η
*/
        for (k = 1; k < n; k++)>
            x[1] = xpipe_lms[k];
            if(k == 1){
                Sx[k] = alpha_c * x[1]^2;
                Ss[k] = alpha_d * Sx[k];
            else
                Sx[k] = (1 − alpha_c) * Sx[k−1] + alpha_c * x[1]^2;
                Ss[k] = (1 − alpha_d)*Ss[k−1] + alpha_d * Sx[k];
            }
            if (k == 1) Sη[k] = alpha_b * Sx[k];
            else{
                if (Sη[k−1] < Ss[k−1]) Sη[k] = (1 − alpha_a) * Sη[k−1] +
alpha_a * Sx[k];
                else Sη[k] = (1 − alpha_b) * Sη[k−1] + alpha_b * Sx[k];
            }
/*
Determine SIG
*/
            if (Ss[k] > 1.3*Sη[k]) SIG = 1;
            else SIG = 0;
/*
x[k] is decomposed into m sub-bands with, m = 100, by using a cos function in a
resonator-type filter bank
*/
            for (j = 1; j < bins; j++){
                rcos = r*cos(2*pi*100*j/fs);
                Xd[j] = x[1] + (2*xdfb[1,j] − x[2])*rcos − r^2*xdfb[2,j];
                xdfb[2,j] = xdfb[1,j];
                xdfb[1,j] = Xd[j];
            }
/*
Determine        and
*/
                if(SIG > 0){
                    Sxn[k,j] = (1 − alpha_d) * Sxnfb[j] + alpha_d * abs(Xd[j]);
                    Sηn[k,j] = (1 − alpha_b) * Sηnfb[j] + alpha_b * abs(Xd[j]);
                else
                    Sxn[k,j] = (1 − alpha_a) * Sxnfb[j] + alpha_a * abs(Xd[j]);
                    Sηn[k,j] = (1 − alpha a) * Sηnfb[j] + alpha_a * abs(Xd[j]);
```

APPENDIX-continued

C Listings of Computational Functions

```
        }
        Sxnfb[j] = Sxn[k,j];
        Sηnfb[j] = Sηn[k,j];
        if (Sxn[k,j] > 0) G = 1 - Sηn[k,j]/Sxn[k,j];
        Xd[j] = G * Xd[j];
    }
    y[k] = sum[Xd];
    x[2] = x[1];
    }
    return(y);
}
```

What is claimed is:

1. A method for sensor output signal noise reduction comprising the steps of:
   introducing at least one sensor output signal into an LMS-based adaptive noise canceller, producing a noise canceller output signal; and
   introducing said noise canceller output signal into a sub-band spectral subtractive routine external to said LMS-based adaptive noise canceller, producing a reduced noise signal.

2. A method in accordance with claim 1, wherein two said sensor output signals are introduced into said LMS-based adaptive noise canceller.

3. A method in accordance with claim 1, wherein said at least one sensor output signal is generated by at least one impulse noise.

4. A method in accordance with claim 1, wherein said LMS-based adaptive noise canceller comprises an adaptive line enhancer.

5. A method in accordance with claim 4, wherein said at least one sensor output signal is generated by a periodic impulse noise.

6. A method in accordance with claim 1, wherein said at least one sensor output signal is an acoustic sensor output signal.

7. A method in accordance with claim 1, wherein said at least one acoustic sensor output signal is produced by at least one pipeline sensor adapted to detect an impulse pipeline noise.

8. A method for sensor output signal noise reduction comprising the steps of:
   introducing at least one sensor output signal derived from a variable amplitude source into an LMS-based adaptive noise canceller, producing a noise canceller output signal; and
   processing said noise canceller output signal using a sub-band spectral subtractive routine external to said LMS-based adaptive noise canceller, producing a reduced noise signal.

9. A method in accordance with claim 8, wherein said at least one sensor output signal is an acoustic sensor output signal.

10. A method in accordance with claim 8, wherein two said sensor output signals are introduced into said LMS-based adaptive noise canceller.

11. A sound detection apparatus comprising:
    an acoustic signal processor;
    at least one acoustic sensor detecting a sound and transmitting an acoustic data signal to said acoustic signal processor;
    said acoustic signal processor having a computer program for reducing noise in said acoustic data signal, said computer program having an LMS-based adaptive noise cancelling mechanism for processing said acoustic data signal and generating a noise canceller output signal; and
    said computer program having a sub-band spectral subtractive noise cancelling mechanism separate from said LMS-based adaptive noise cancelling mechanism for processing said noise canceller output signal and generating a reduced noise acoustic data signal.

12. A sound detection apparatus in accordance with claim 11, comprising a plurality of said acoustic sensors.

13. A sound detection apparatus in accordance with claim 11, wherein said LMS-based adaptive noise cancellation mechanism comprises an adaptive line enhancing mechanism.

14. A computer readable medium for reducing noise in an acoustic data signal, said computer readable medium comprising:
    an LMS-based mechanism for generating a reduced noise acoustic data signal using an LMS-based acoustic noise cancellation mechanism; and
    a subtractive mechanism for reducing noise in said reduced noise acoustic data signal using a sub-band spectral subtractive noise reduction mechanism, said sub-band spectral subtractive noise reduction mechanism being separate from said LMS-based acoustic noise cancellation mechanism.

15. A computer readable medium in accordance with claim 14, wherein said LMS-based mechanism comprises an adaptive line enhancement mechanism.

* * * * *